(12) United States Patent
Tobies

(10) Patent No.: US 7,606,838 B2
(45) Date of Patent: Oct. 20, 2009

(54) DISTRIBUTED CONFLICT RESOLUTION FOR REPLICATED DATABASES

(75) Inventor: Stephan Tobies, Erkelenz (DE)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 11/359,107

(22) Filed: Feb. 22, 2006

(65) Prior Publication Data

US 2007/0198599 A1 Aug. 23, 2007

(51) Int. Cl.
*G06F 17/30* (2006.01)
(52) U.S. Cl. ............... 707/201; 707/203; 707/204; 707/205
(58) Field of Classification Search ............ None
See application file for complete search history.

(56) References Cited

U.S. PATENT DOCUMENTS

| | | | | | |
|---|---|---|---|---|---|
| 5,774,717 | A | * | 6/1998 | Porcaro | 707/202 |
| 5,787,262 | A | * | 7/1998 | Shakib et al. | 709/205 |
| 5,937,414 | A | * | 8/1999 | Souder et al. | 707/203 |
| 6,636,873 | B1 | * | 10/2003 | Carini et al. | 707/201 |
| 6,983,293 | B2 | | 1/2006 | Wang | |
| 6,993,522 | B2 | * | 1/2006 | Chen et al. | 707/7 |
| 7,386,797 | B1 | * | 6/2008 | Chatterjee et al. | 715/751 |
| 2003/0182319 | A1 | * | 9/2003 | Morrison | 707/200 |
| 2003/0220966 | A1 | * | 11/2003 | Hepper et al. | 709/203 |
| 2004/0019614 | A1 | * | 1/2004 | Wang | 707/202 |
| 2004/0122870 | A1 | * | 6/2004 | Park et al. | 707/201 |
| 2005/0177617 | A1 | * | 8/2005 | Banginwar et al. | 709/203 |
| 2007/0180075 | A1 | * | 8/2007 | Chasman et al. | 709/223 |

FOREIGN PATENT DOCUMENTS

EP 1475724 * 11/2004

OTHER PUBLICATIONS

YoungSeok Lee, YounSoo Kim, and Hoon Cho,i Conflict resolution of data synchronization in mobile environment Department of Computer Engineering, Chungnam National University, Korea.*
Conflict Detection Tradeoffs for Replicated Data, Carey et al, ACM Transactions on Database System, vol. 16, No. 4, Dec. 1991, pp. 703-746.*
Cox, Russ et al., File Synchronization with Vector Time Pairs, MIT, Feb. 28, 2005, 15 pages.
Saito, Yasushi et al., Optimistic Replication, Microsoft Corporation, Technical Report MSR-TR-2003-60, Sep. 2003, 51 pages.
International Search Report, Application No. PCT/US2007/002186, Dated Jul. 13, 2007. (8 pages).

* cited by examiner

*Primary Examiner*—Pierre M Vital
*Assistant Examiner*—Augustine Obisesan

(57) ABSTRACT

One or more resolution processes run concurrently with the synchronization process of each replica, in response to detection of one or more synchronization conflicts. Each resolution process works to resolve the conflict for a data object while the synchronization process continues to process other synchronization updates. After a conflict resolution has been determined, the conflict resolution is tested against current conditions of the local replica. If the conflict resolution is not stale, it is applied to the local replica and passed back to the synchronization process for propagation to remote replicas. Otherwise, if the conflict resolution is stale, it is discarded.

12 Claims, 4 Drawing Sheets

DISTRIBUTED CONFLICT RESOLUTION FOR REPLICATED DATABASES

BACKGROUND

Generally, a database is an organized collection of data objects (e.g., data tables, data records, files, etc.) recorded in a storage medium in a systematic way for access by a computing system. Each data object can include one or more data records typically organized as a set of keyed data elements or values to facilitate retrieval and sorting. A database can generally be described structurally by a schema, which specifies the types and relationships of data objects in the database. A program, such as a database management system (DBMS), can query the database to access specific data objects.

Replication allows a single database of one storage medium to be copied to a second storage medium, effectively creating a separate instance of the original database. The copy of the database on the second storage medium is termed a "replicated database". The original database and the replica (collectively termed "replicas") share all or part of a common schema, including common data objects, key-value pairs, and other identifiers and structures, to couple the related replicas together. The shared schema allows identical queries to be used with both replicas. Furthermore, each replica can be modified locally and then updated with other related replicas through a process termed "synchronization". With synchronization, changes to data objects in one replica are recorded and propagated as synchronization update to other related replicas, where the same changes are executed on the corresponding data objects of the related replicas.

However, a conflict can occur when corresponding data objects in separate replicas are modified concurrently. Generally, a conflict represents a modification of a data object at one replica A, followed by a modification of the corresponding data object at another replica B, before information of the change at A has been propagated through a communications link to B. For example, the price of a product might be changed to $X in one replica and the price of the same product might be changed to $Y in another replica at about the same time (e.g., prior to the synchronization of each change with the other replica), thereby presenting a conflict between the two replicas relative to the price of the product. To bring the replicas back into a consistent state, the conflict can be detected and then resolved.

Different strategies exist to detect conflicts. For example, the time at which a replica has been modified can be tracked and propagated to other replicas during synchronization. Upon receipt of a synchronization update, each receiving replica can detect the conflict by comparing the change time for the data object at the remote replica and the change time for another corresponding data object (whether local or remote).

After a conflict is detected, the distributed database system can work to resolve the conflict. Different strategies also exist to resolve such conflicts. For example, conflicts can be resolved algorithmically, through user interaction, etc. However, due to the distributed nature of a replicated database system and the asynchronous nature of synchronization, competing conflicts in corresponding data objects can be detected concurrently at different replicas. Detection of competing conflicts can therefore trigger and propagate competing conflict resolutions throughout the distributed database, thereby introducing new conflicts. As such, existing database servers tend to stop database processing during conflict resolution, so as to avoid such competing conflict resolutions. Moreover, competing conflict resolutions are particularly challenging for "non-idempotent" conflicts (i.e., where different replicas would resolve the conflict differently or when a resolution would ripple significant changes throughout the distributed database). Accordingly, the problem of how to handle conflict resolutions at different replicas in a distributed database without stopping other database processing becomes relevant.

SUMMARY

Implementations described and claimed herein address the foregoing problems by executing one or more resolution processes to run concurrently with the synchronization process of each replica, in response to detection of one or more synchronization conflicts. Each resolution process works to resolve the conflict for a data object while the synchronization process continues to process other synchronization updates. After a conflict resolution has been determined, the conflict resolution is tested against current conditions of the local replica. If the conflict resolution is not stale (e.g., no external conflict resolution has been received during the local resolution process), it is applied to the local replica and passed back to the synchronization process for propagation to remote replicas. Otherwise, if the conflict resolution is stale (e.g., an external conflict resolution has been received from another replica), the local conflict resolution is discarded.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
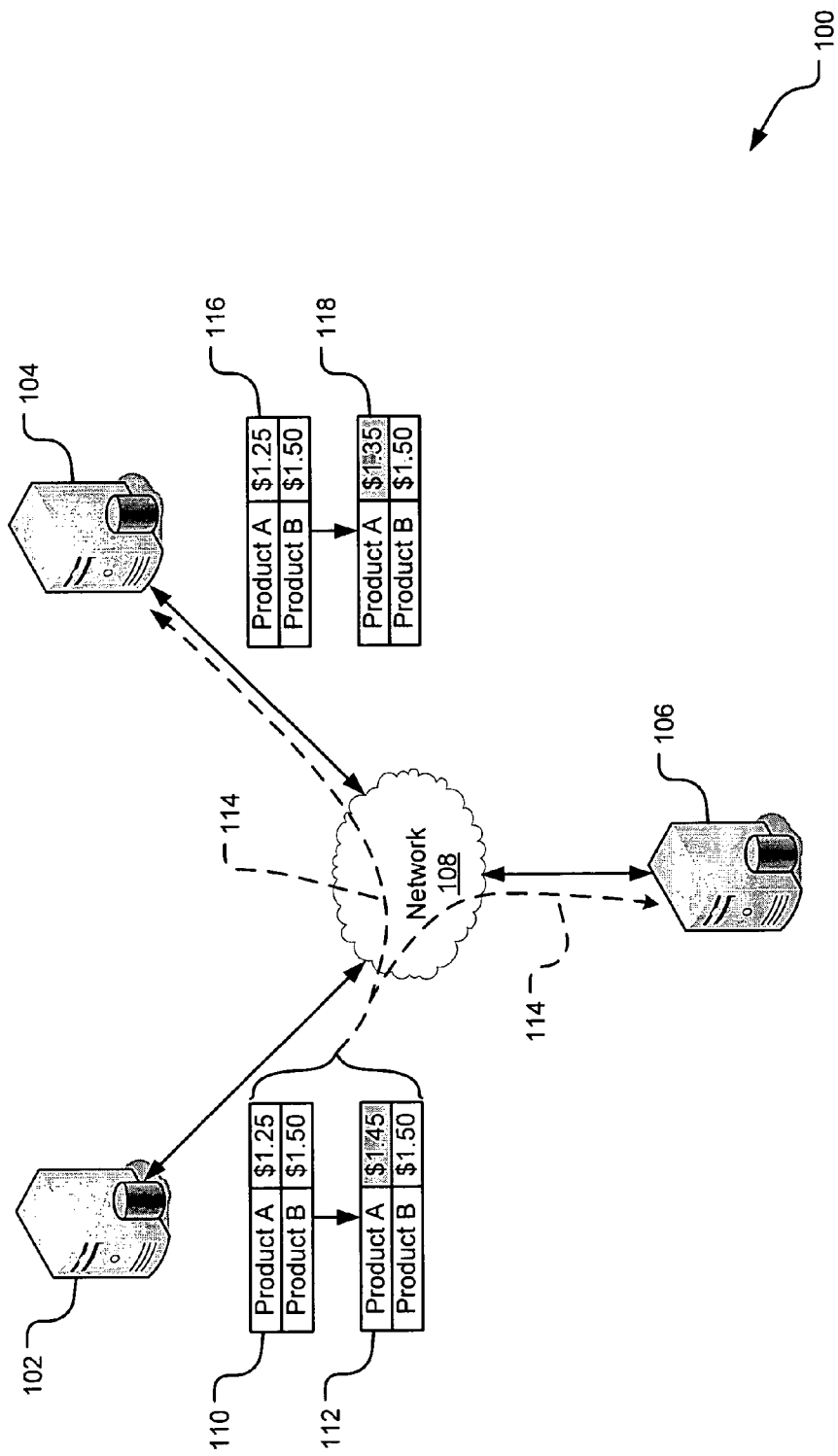
FIG. 1 illustrates a distributed database system depicting an example distributed conflict resolution.

FIG. 1 illustrates a distributed database system 100 depicting an example distributed conflict resolution. The distributed database system 100 may be in the form of a distributed relational database, file system, data log or other organized collection of data. A first database server 102, a second database server 104, and a third database server 106 are communicatively connected via a network 108, such as the Internet, a local area network (LAN), etc. Each database server has access to a distinct replica of a distributed database. Each replica shares a complete or partial schema with other replicas in the distributed database system 100. Additionally, the replicas are coupled by a synchronization framework in which each replica propagates its changes via synchronization updates to the other related replicas, which can then update their own data objects with the propagated changes.

Synchronization refers to updating a data object of one replica with the data of a changed data object of another replica so that the first data object reflects the changes made to the changed data object. In one implementation, for example, synchronization of a local replica is executed as a background thread or process. If a remote copy of a data object has been changed and a local copy of the data object has not yet been updated to reflect the change, synchronization effects the change to the local copy of the data object. In addition, synchronization continuously propagates local changes as synchronization updates to other related replicas and processes synchronization updates received from remote replicas to update local data. Using these features, a change in one replica can be synchronized in all other related replicas in the distributed database system.

However, if changes in corresponding data objects of two different replicas are detected concurrently, a conflict can result. For example, in FIG. 1, data object 110 of the replica associated with the database server 102 is updated with a new price, resulting in an updated data object 112 (see the shaded cell containing the changed price). The change operation is propagated to other related replicas (see dashed arrows 114 branching to replicas 104 and 106). However, concurrent with the propagation of the change from the replica associated with the database server 104, a corresponding data object 116 of the replica associated with the database server 104 is updated with a new price, resulting in an updated data object 118 (see the shaded cell containing the changed price). As a result, at the database server 102, a conflict is detected between corresponding data objects of the replicas associated with the database servers 102 and 104.

Different strategies may be used to detect such conflicts. In one implementation, a distributed database system employs a distributed time stamping mechanism and uses synchronization parameters to detect conflicts. Synchronization parameters can refer explicitly to vector time pairs, real time values, version vectors, or other values that can be used to track update events relative to each other.

In one implementation, each replica maintains a local time stamp, which is incremented whenever the state of the data at the replica changes, either due to local updates or due to synchronization with a peer replica. For each data object, the replica also maintains two synchronization parameters: (1) a modification parameter m indicating (for each locally known replica R) the time stamp at R of the last change in the data object at R; and (2) a synchronization parameter s indicating (for each locally known replica R) the time stamp at R of the last synchronization of the data object at R (e.g., resulting from a remote synchronization update). In one implementation, the parameters m and s are represented as vectors of a time stamps with a synchronization parameter corresponding to each known replica, although other parameter types may be employed. Informally, the modification parameter m tracks the local version of a data object, and the synchronization time parameter s tracks how current the data object is relative to other replicas. A synchronization process compares combinations of the modification time parameter $m_A$ and the synchronization time parameter $S_A$ (associated with a synchronization update of a data object of a remote replica A), and the modification time parameter $m_B$ and the synchronization time parameter $s_B$ (associated with the corresponding local data object in a local replica B) to determine whether to update the local data object.

For example, when considering whether the local data object in replica B needs to be updated relative to replica A, $m_A \leq s_B$ tests whether the local data object in replica B is synchronized with the changes in the corresponding data object of replica A. Therefore, if $m_A \leq s_B$, replica B does not need to be updated because replica B has already been synchronized with the most recent modification available from replica A. In contrast, if $m_A > s_B$, then $m_B \leq s_A$ tests whether replica A is synchronized relative to the latest modification from replica B. Therefore, if $m_A > s_B$ and $m_B \leq s_A$, then replica A has more recent modifications that have not yet been synchronized with replica B and so replica B needs to be updated with the synchronization update from replica A. However, if $m_A > s_B$ and $m_B > s_A$, then both replicas A and B have been modified with concurrent modifications and a conflict exists. It should be understood that other conflict detections schemes may be employed.

Having detected a conflict, a database server would typically attempt to resolve the conflict through one of a variety of conflict resolution techniques. In one implementation, a user may be presented with the conflict and asked to choose the desired result, which will then be propagated throughout the distributed database system 100. In other implementations, the conflict may be resolved algorithmically (e.g., select the most recent change based on the time vectors, select the highest change value, etc.). Other conflict resolution techniques may also be employed.

The database server 102 detects the conflict and works to resolve the conflict. In one implementation, the ongoing synchronization process executing on the database server 102 spawns a conflict resolution thread and then continues synchronizing with other synchronization updates received from other replicas. These updates may include conflict resolutions for corresponding conflicts that have been generated at remote replicas. After the conflict resolution has been determined, the database server 102 determines whether the resolution is stale. A stale resolution refers to a conflict resolution that is not longer valid because an intervening conflict synchronization update from a remote replica was already applied to the same data object during the processing of the conflict resolution by the local replica. In this circumstance, therefore, the conflict has already been resolved by a remote database server, or the data object has changed by other means, and the local conflict resolution determined by the resolution process is obsolete. If the database server 102 determines that the local conflict resolution is not stale, the resolution is applied locally and propagated to other related replicas in the distributed database system.

Figure 2:
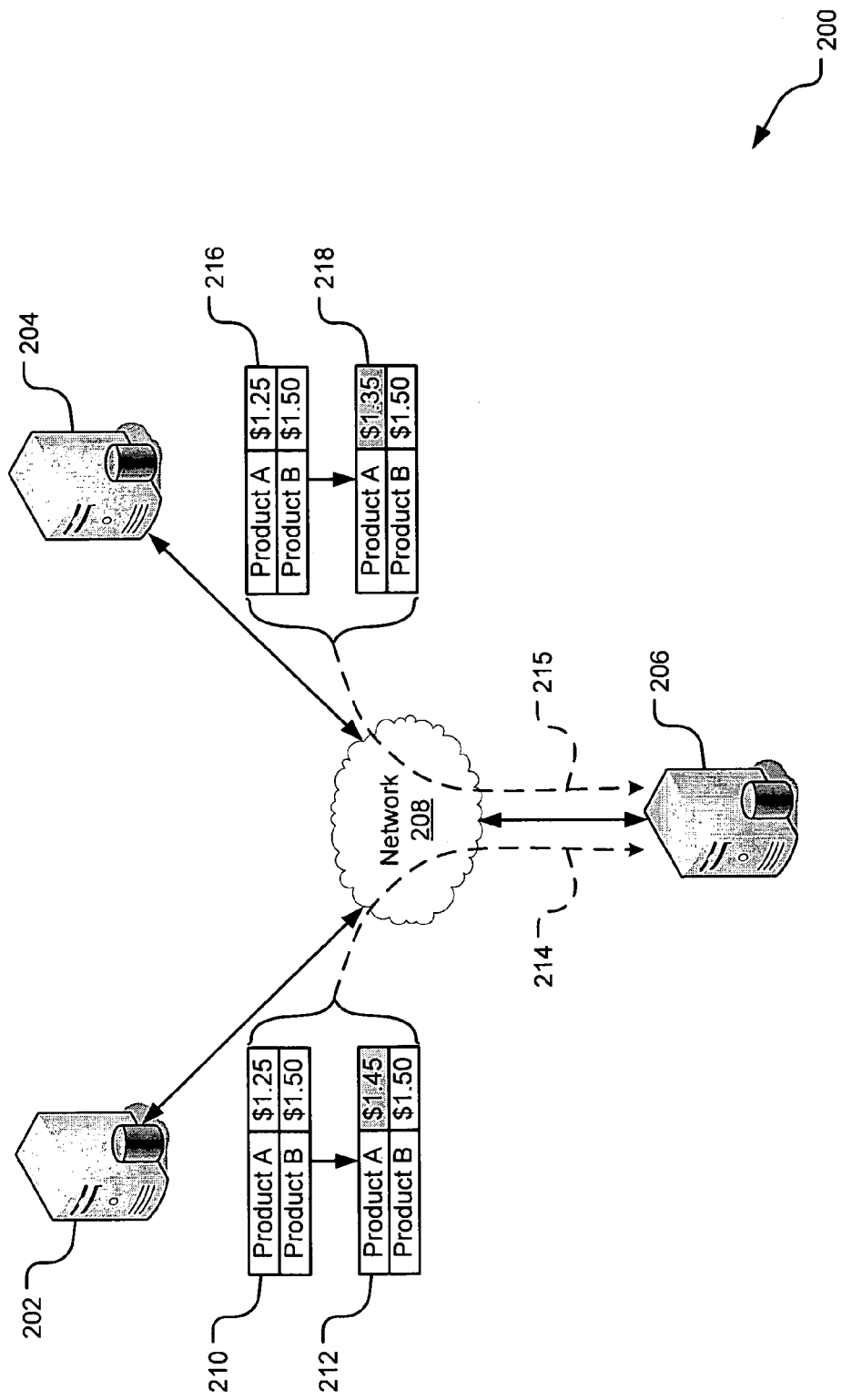
FIG. 2 illustrates a distributed database system depicting another example distributed conflict resolution.

FIG. 2 illustrates a distributed database system 200 depicting another example distributed conflict resolution. A first database server 202, a second database server 204, and a third database server 206 are communicatively connected via a network 208, such as the Internet, a local area network (LAN), etc. Each database server has access to a distinct replica of a distributed database. Each replica shares a complete or partial schema with other replicas in the distributed database system 200. Additionally, the replicas are coupled by a synchronization framework in which each replica propagates its changes to the other related replicas, which can then update their own data with the propagated changes.

As with the example of FIG. 1, conflicts may arise. For example, in FIG. 2, data object 210 of the replica associated with the database server 202 is updated with a new price, resulting in an updated data object 212 (see the shaded cell containing the changed price). The change operation is propagated to other related replicas (see dashed arrow 214 propagating the change operation to replica 206—it should be understood that the change operation is also propagated to replica 204). However, concurrent with the propagation of the change from the replica associated with the database server 204, a corresponding data object 216 of the replica associated with the database server 204 is updated with a new price, resulting in an updated data object 218 (see the shaded cell containing the changed price). The change operation is propagated to other related replicas (see dashed arrow 215 propagating the change operation to replica 206—it should be understood that the change operation is also propagated to replica 202). As a result, at the database server 206, a conflict is detected between corresponding data objects of the replicas associated with the database servers 202 and 204.

The database server 206 detects the conflict and works to resolve the conflict. In one implementation, the ongoing synchronization process executing on the database server 206 spawns a conflict resolution thread and then continues synchronizing with other updates received from other replicas. After the conflict resolution has been determined, the database server 206 determines whether the resolution is stale. A stale resolution refers to a conflict resolution that is not longer valid because an intervening conflict synchronization update from a remote replica or a local modification was already applied to the same data object during the processing of the conflict resolution by the local replica. In this circumstance, therefore, the conflict has already been resolved by a remote database server, or the data objects has changed by other means, and the local conflict resolution determined by the resolution process is obsolete. If the database server 206 determines that the local conflict resolution is not stale, the resolution is applied locally and propagated to other related replicas in the distributed database system.

Figure 3:
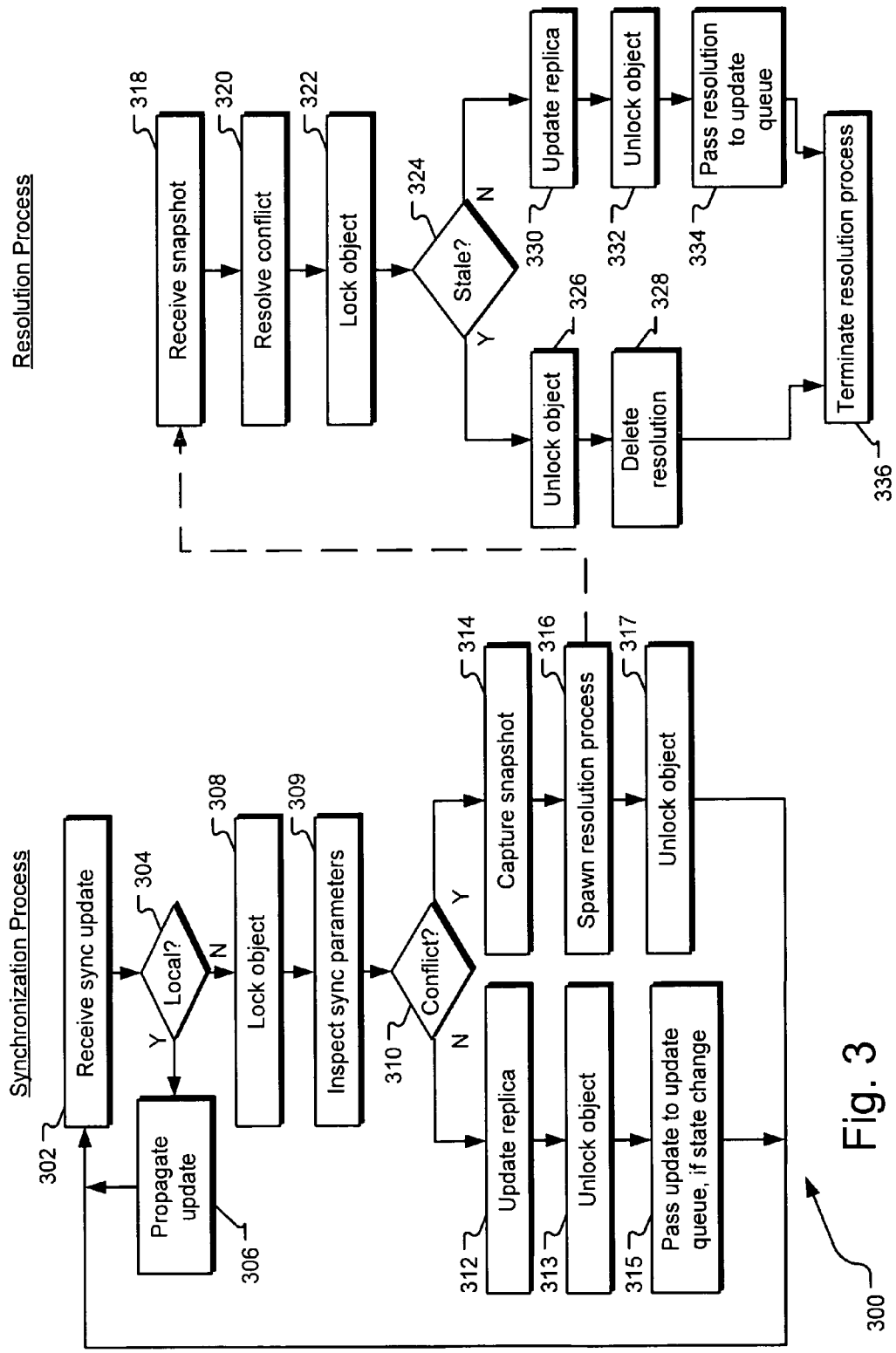
FIG. 3 illustrates example synchronization and resolution processes for a distributed database system.

FIG. 3 illustrates example synchronization and resolution processes 300 for a distributed database system. A synchronization process typically executes on each database server, receiving remote synchronization updates from remote replicas and propagating local synchronization updates to those remote replicas. Each synchronization update includes synchronization parameters, such as version vectors, vector time pairs, or other parameters. For example, a synchronization parameter may take the form of a vector containing locally known information about the synchronization or modification state of the data object at each known remote replica.

A receiving operation 302 receives a synchronization update from an update queue. The update queue includes synchronization updates received from remote replicas and synchronization updates to be propagated from the local replica (e.g., local conflict resolutions, local synchronizations, or other local modifications). If the synchronization update is determined to be local by decision operation 304 (e.g., an originally local modification, a locally determined conflict resolution, or a local update resulting from a remote sync update), then a propagation operation 306 sends the synchronization update to other replicas and processing returns to the receiving operation 302 to receive the next synchronization update in the update queue. If the synchronization update is determined by the decision operation 304 to be from a remote replica (e.g., a remote synchronization update or a remotely determined conflict resolution), a locking operation 308 locks the data object in the local replica to prevent races conditions between remote synchronization updates and the application of the local conflict resolution. An inspection operation 309 then examines the synchronization parameters of the synchronization update to determine whether a conflict exists, such as using the modification parameter (m) and synchronization parameter (s) method described previously. If a conflict is not detected in a detection operation 310, then an update operation 312 either applies the change from the synchronization update to the local replica or does nothing (e.g., if the local replica is already synchronized).

In one implementation, two different types of changes may be applied from an update, although only one type or more than two types may be applied in alternative implementations. In a first type of change, the update results in a state (e.g., data) change in the local replica. For example, a synchronization update may indicate a value of a data object in the local replica. In response, the update operation 312 changes the value of the data object and updates the synchronization parameters associated with the data object. In a second type of change, the update does not result in a state change in the local replica. For example, the value indicated in the synchronization update is the same as the value already in the local data object. In response, the update operation 312 need only update the synchronization parameters associated with the data object and the rest of the synchronization update (e.g., the value change) can be discarded. A After the update operation 312, an unlocking operation 313 unlocks the data object, and a queuing operation 315 then passes the synchronization update as a local update to the update queue, which can be processed normally in the next phase of the synchronization process. Alternatively, the synchronization update can be passed directly to the propagation operation 306. Processing then continues to the propagation operation 306 to inform other remote replicas of the change before it returns to the receiving operation 302 to receive another synchronization update from the update queue.

If the detection operation 310 detects a conflict, then a snapshot operation 314 captures a snapshot of the conflict by recording information relating to the synchronization update and the conflicting local data object, such as a current time stamp of the local replica, the state (e.g., value) of the local data object, a state of the remote data object, the local synchronization parameters, and the remote synchronization parameters. A new process operation 316 initiates (e.g., spawns) a separate resolution process (e.g., a new thread), accompanied by the snapshot to determine a resolution of the conflict. The resolution process is associated with the data object associated with the conflict, so that multiple resolution processes may be running simultaneously for different data objects. After initiating the resolution process, the synchronization process executes an unlocking operation 317, which unlocks the data object, and then returns to the receiving operation 302 while the resolution process continues to process the conflict. When one or more processes are operating concurrently, each process can execute instructions in cooperation with other processes on one or more processors in a multitasking or multithreaded environment. This concurrent processing allows the synchronization process to continue updating the local replica with the synchronization update and propagating other changes while the resolution process handles the conflict.

Within the resolution process, a receiving operation 318 receives the snapshot from the synchronization process. A resolution operation 320 resolves the conflict, such as by applying a conflict resolution algorithm or asking a user to select one of the two data states (local or remote). After the conflict is resolved, a locking operation 322 locks the data object in the local replica to prevent races conditions between remote synchronization updates and the application of the local conflict resolution.

Before applying the resolved update to the local replica, the resolution process detects whether the conflict resolution is stale. Stale implies that, during the time the resolution was being processed, another remote synchronization update was received and applied to the same local data object. Accordingly, a stale testing operation 324 records conditions existing after the resolution operation 320 and compares the local time stamp received in the snapshot from the synchronization process with a current synchronization parameter associated the local data object (e.g., captured after the resolution operation 320). If the synchronization parameter is more recent than the time stamp from the snapshot, then the local conflict resolution is stale. Therefore, an unlocking operation 326 unlocks the data object in the replica, and a deleting operation 328 deletes the resolution.

In contrast, if the stale testing operation 324 determines that the local conflict resolution is not stale, an updating operation 330 applies the conflict resolution to the local replica, including updating the data of the local data object and updating the synchronization parameters of the local data object to reflect application of the conflict resolution. Thereafter, an unlocking operation 332 unlocks the data object in the local replica. A queuing operation 334 then passes the conflict resolution as a local update to the update queue, which can be processed normally in the synchronization process. Alternatively, the conflict resolution can be passed directly to the propagation operation 306.

A termination operation 336 terminates the resolution process. As described, multiple resolution processes can be executing concurrently for different conflicts, being initiated by a single synchronization process executing in association with a local replica.

It should also be understood that when an intervening synchronization update for a data object is received and processed in the synchronization process, during execution of a resolution process for that same data object, a new potential conflict may be detected. In such case, if the synchronization update includes a remote data state that is compatible (e.g., equal) with the current local state (e.g., representing a no conflict), then the local data object is updated, which includes updating the synchronization parameters and the associated resolution process can be interrupted and discarded. In contrast, if the synchronization update includes a remote data state that is not compatible (e.g., not equal) with the current local state of the data object (e.g., representing a conflict), then the synchronization update is discarded in favor of the ongoing conflict resolution associated with the data object.

Figure 4:
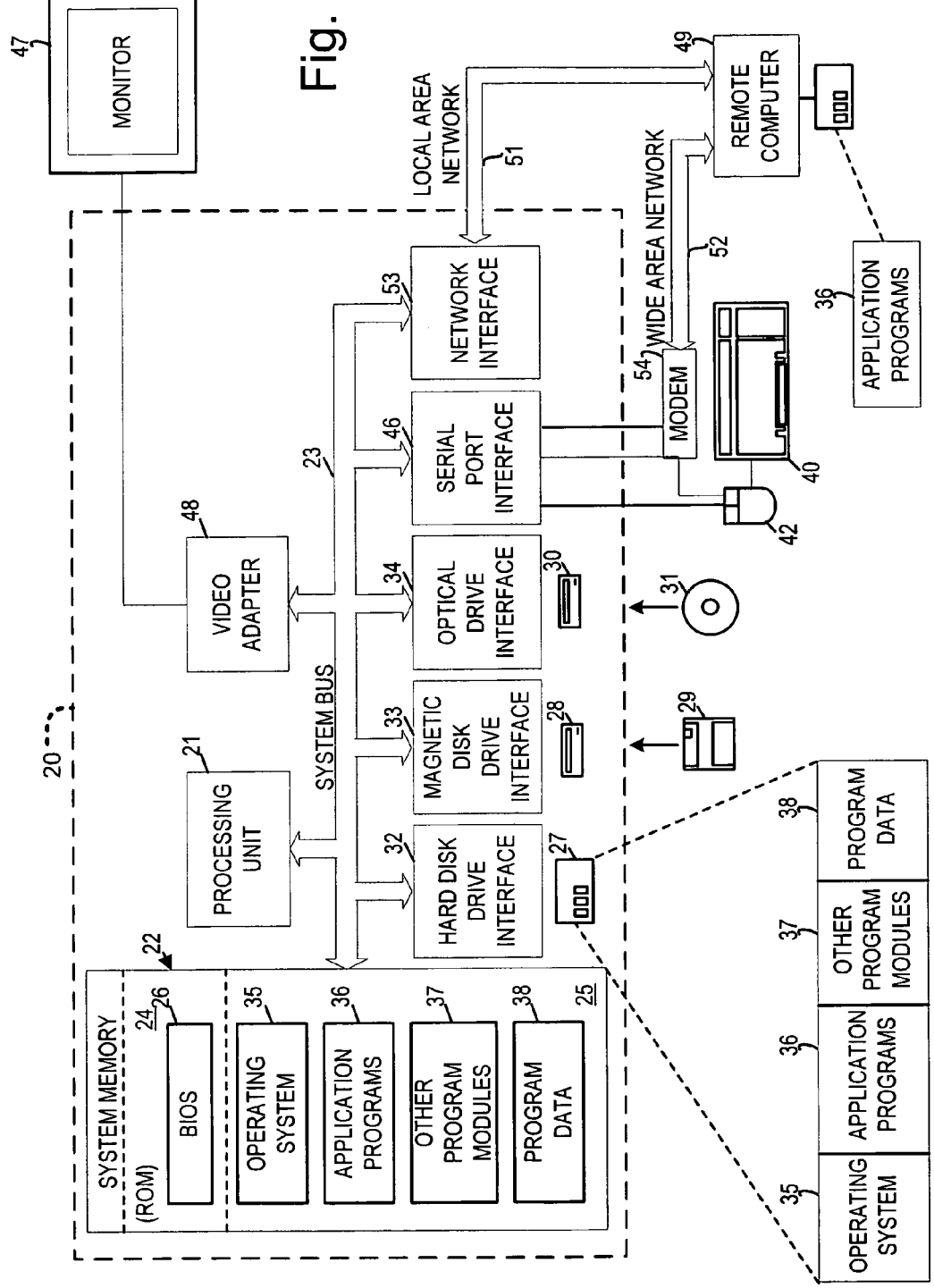
FIG. 4 illustrates an example system that may be useful in implementing the described technology.

The example hardware and operating environment of FIG. 4 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a synchronization module, a resolution module, and other modules may be embodied by instructions stored in memory 22 and/or storage devices 29 or 31 and processed by the processing unit 21. A replica, a snapshot, a conflict resolution, a synchronization update, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of resolving a conflict in synchronization of a local replica, the method comprising:
    executing a synchronization process that receives synchronization updates from one or more remote replicas, the synchronization process initiating a resolution process associated with a local data object of the local replica if a conflict is detected between the local data object and a synchronization update; and
    executing the resolution process concurrently with the synchronization process, responsive to initiation of the resolution process by the synchronization process, the resolution process determining a conflict resolution while the synchronization process processes other synchronization updates, wherein the synchronization process further records a snapshot of the conflict and passes the snapshot to the resolution process, if a conflict is detected between the local data object and the synchronization update, wherein the resolution process further determines whether the conflict resolution is stale by comparing the snapshot to conditions existing after the conflict resolution has been determined, and wherein the resolution process further updates the local data object with the conflict resolution, while the synchronization process processes the other synchronization updates.

2. The method of claim 1 wherein the resolution process further determines whether the conflict resolution is stale and updates the local data object with the conflict resolution, if the conflict resolution is not stale.

3. The method of claim 1 wherein the snapshot is captured prior to resolution of the conflict and includes a local time stamp, a state of the local data object, and a state of a corresponding remote data object received from the synchronization update.

4. The method of claim 1 wherein the resolution process further records a synchronization parameter associated with the local data object and determines that the conflict resolution is stale if the local time stamp from the snapshot is earlier than the synchronization parameter.

5. The method of claim 1 wherein the resolution process farther passes the conflict resolution to the synchronization process for propagation to one or more remote replicas.

6. The method of claim 1 wherein the synchronization process applies the synchronization update to the local data object if a conflict is not detected between the local data object and a synchronization update.

7. The method of claim 1 wherein the resolution process further locks the local data object before updating the local data object with the conflict resolution.

8. The method of claim 1 wherein the resolution process further locks the local data object before testing whether the conflict resolution is stale.

9. The method of claim 1 wherein the resolution process farther deletes the conflict resolution if the conflict resolution is stale.

10. A computer-readable storage medium having computer-executable instructions for performing a computer process that implements the operations recited in claim 1.

11. A computer system for resolving a conflict in synchronization of a local replica, the system comprising:
    a processing unit coupled to a memory; the memory comprising a synchronization module and a resolution module;
    the synchronization module executes a synchronization process that receives synchronization updates from one or more remote replicas, the synchronization process initiating a resolution process associated with a local data object of the local replica if a conflict is detected between the local data object and a synchronization update; and
    the resolution module executes the resolution process concurrently with the synchronization process, responsive to initiation of the resolution process by the synchronization process, the resolution process determining a conflict resolution while the synchronization process processes other synchronization updates, wherein the synchronization process further records a snapshot of the conflict and passes the snapshot to the resolution process, if a conflict is detected between the local data object and the synchronization update, wherein the resolution process further determines whether the conflict resolution is stale by comparing the snapshot to conditions existing after the conflict resolution has been determined, wherein the resolution process further updates the local data object with the conflict resolution, while the synchronization process processes the other synchronization updates.

12. The system of claim 11 wherein the resolution process further determines whether the conflict resolution is stale and updates the local data object with the conflict resolution, if the conflict resolution is not stale.

* * * * *

UNITED STATES PATENT AND TRADEMARK OFFICE
CERTIFICATE OF CORRECTION

| | |
|---|---|
| PATENT NO. | : 7,606,838 B2 |
| APPLICATION NO. | : 11/359107 |
| DATED | : October 20, 2009 |
| INVENTOR(S) | : Stephan Tobies |

It is certified that error appears in the above-identified patent and that said Letters Patent is hereby corrected as shown below:

In column 10, line 22, in Claim 5, delete "farther" and insert -- further --, therefor.

In column 10, line 36, in Claim 9, delete "farther" and insert -- further --, therefor.

Signed and Sealed this
Twenty-second Day of February, 2011

David J. Kappos
*Director of the United States Patent and Trademark Office*